United States Patent [19]

Broecker et al.

[11] Patent Number: 4,521,387
[45] Date of Patent: Jun. 4, 1985

[54] PURIFICATION OF GASES CONTAINING CO AND/OR $CO_2$

[75] Inventors: Franz J. Broecker, Ludwigshafen; Hans Gettert, Gross-Sachsen; Knut Kaempfer, Ludwigshafen, all of Fed. Rep. of Germany

[73] Assignee: BASF Aktiengesellschaft, Fed. Rep. of Germany

[21] Appl. No.: 552,930

[22] Filed: Nov. 18, 1983

[30] Foreign Application Priority Data

Nov. 23, 1982 [DE] Fed. Rep. of Germany ....... 3243206

[51] Int. Cl.³ .............................................. B01D 53/36
[52] U.S. Cl. .................................... 423/210; 423/219; 423/230; 423/238; 423/240; 423/244; 423/245; 502/202; 502/345
[58] Field of Search ............... 423/210, 230, 244, 238, 423/245, 219, 210 M, 648 R, 415 A, 240; 502/345, 202

[56] References Cited

U.S. PATENT DOCUMENTS

| | | | |
|---|---|---|---|
| 1,631,823 | 6/1927 | Jannek | 423/210 M |
| 4,048,196 | 9/1977 | Broecker et al. | 502/345 X |
| 4,088,736 | 5/1978 | Courty et al. | 423/230 |
| 4,386,017 | 5/1983 | Nakamura et al. | 502/202 |

FOREIGN PATENT DOCUMENTS

| | | | |
|---|---|---|---|
| 1522389 | 8/1978 | United Kingdom | 423/244 R |
| 801858 | 2/1981 | U.S.S.R. | 423/244 R |

OTHER PUBLICATIONS

Chemical Abstracts, vol. 77, 1972, p. 155, Abstract No. 90878j.

*Primary Examiner*—Earl C. Thomas
*Attorney, Agent, or Firm*—Keil & Weinkauf

[57] ABSTRACT

Gases containing CO and/or $CO_2$ are purified by removing sulfur compounds and other impurities by catalytic reaction at elevated temperatures by a process in which the gases to be purified are passed directly through a catalyst charge containing a Cu/ZnO catalyst prepared by thermal decomposition of a mixed crystalline compound of zinc hydroxide carbonate, and the space velocity is set at 500–5,000 m³ (S.T.P.) per m³ of catalyst per hour. Preferably, the catalyst used is a Cu/ZnO catalyst which is prepared by thermal decomposition of a catalyst precursor of the general formula $Cu_xZn_y(OH)_6(CO_3)_2$.

3 Claims, No Drawings

PURIFICATION OF GASES CONTAINING CO AND/OR CO₂

For the purposes of the present invention, the general term synthesis gas means gases which contain mainly H$_2$, CO and CO$_2$ individually or as a mixture. They are usually produced from higher hydrocarbons by steam reforming or by partial oxidation, or are obtained as by-products in the electrolysis of alkali metal chlorides or the preparation of ethylene or acetylene.

Synthesis gas is required for a very wide variety of uses, for example methanol synthesis, ammonia synthesis, Fischer-Tropsch synthesis, hydrogenation, desulfurization of mineral oil products or the production of a substitute gas for natural gas.

The stated processes employ catalysts, these being used in a fixed bed, as a suspension or in the form of a homogeneous solution, depending on the particular case. The active component of the catalyst consists either of one or more reduced metals or of their oxides and/or sulfides.

In other cases, especially for homogeneous catalysis, the active metals are present as soluble complexes with a very large variety of ligands. All the catalysts, ie. those used for both homogeneous and heterogeneous catalysis, have in common the disadvantage that they are more or less irreversibly damaged by catalyst poisons.

If the reaction mixture contains components which form stable compounds with the catalysts, ie. block the active centers, the catalyst is said to be poisoned. The agent causing this is called a catalyst poison.

There are also substances which have adverse effects, eg. metal carbonyls, which do not poison the catalyst but become concentrated in the catalyst bed as a result of decomposition under the reaction conditions. These impurities can cause difficulties during working up of the catalyst or can adversely affect the selectivity of a catalyst; this can occur if the entrained metals reach a certain concentration and their own catalytic properties cause side reactions. In a low-temperature conversion reactor, nickel carbonyl can result in methanation taking place.

There are a large number of processes for the purification of gases, for example by means of gas washes which wash out the impurities from gases with the aid of chemical or physical solvents under superatmospheric pressure by a countercurrent method, or purification by adsorption on active carbon or molecular sieves, followed by regeneration by a change of pressure or temperature. However, chemical processes, for example the desulfurization of mineral oil products by hydrogenation over a Co/Mo or Ni/Mo catalyst and subsequent binding of the resulting H$_2$S to ZnO, are also known.

The object of most of the processes is the removal of large amounts of impurities from gas streams. They are less useful for removing small amounts of impurities or traces which are close to the limit of detection. Although purification processes which employ molecular sieves are suitable for removing traces, they have the critical disadvantage that they are not selective. In addition to removing undesirable impurities, they also remove harmless components, eg. water or CO$_2$. As a result, their capacity is restricted, and the plants based on this principle have to be regenerated at short intervals of time, with considerable energy consumption.

A process for the removal of hydrogen cyanide from gases containing hydrogen sulfide, wherein hydrogen cyanide is hydrogenated over a ZnO or ZnS catalyst at above 180° C., and the removal of CO from hydrogen-containing gases by methanation over an Ni catalyst at about 250° C., are also known.

We have found that, in the fine purification of gases containing H$_2$, CO and/or CO$_2$ for the removal of sulfur compounds and other impurities by catalytic reaction at elevated temperatures, the disadvantages of the conventional processes are avoided if the gases to be purified are passed directly through a catalyst charge containing a Cu/ZnO catalyst prepared by thermal decomposition of a mixed crystalline compound of zinc hydroxide carbonate, and the space velocity is set at 500–5,000 m$^3$ (S.T.P.) per m$^3$ of catalyst per hour.

In a particular embodiment of the novel process, the gases to be purified, if these additionally contain troublesome metal carbonyls, are mixed with oxygen or oxygen-containing gases so that the oxygen content is from 20 to 200 vol. ppm and, before being subjected to the actual catalytic treatment, are passed through an active carbon bed at from 50° to 150° C., at a space velocity of 500–5,000 m$^3$ (S.T.P.) per m$^3$ of catalyst per hour.

In the novel process, the catalyst used is preferably a Cu/ZnO catalyst prepared by thermal decomposition of a catalyst precursor of the general formula

$$Cu_xZn_y/(OH)_6(CO_3)_2,$$

where $x+y=5$ and x and y are integers or non-integral numbers in the ranges $x=1.0–2.5$ $y=2.5–4.0$.

In a particular procedure for preparing the catalyst, from 1 to 15 atom % of aluminum, chromium and/or boron are coprecipitated, during the precipitation of the catalyst precursor, as structural promoters.

Impurities which can occur in particular in synthesis gases and which are removed using the novel process include primarily sulfur compounds, eg. H$_2$S, COS, CS$_2$, CH$_3$SH or higher mercaptans. Such gases, when produced by partial oxidation of fossil fuels, also contain compounds such as HCN, CHOOH, HCL, Fe carbonyls, Ni carbonyls and vanadium carbonyls, as well as unreacted oxygen. However, the novel process can also be used for the quantitative removal of mercury, which is present in the hydrogen produced in the electrolysis of alkali metal chlorides.

The novel purification process is not restricted to synthesis gases but can also be used in other cases, for example, for the purification of carbon dioxide contaminated with sulfur compounds, if the carbon dioxide is to be used for the production of mineral water.

The purification of CO-containing gases is advantageously carried out in two stages. In the first stage, the metal carbonyls present in the gas are removed. To do this, the gas is heated to 50°–150° C., advantageously 100° C., and is mixed with an amount of oxygen or oxygen-containing gases such that the oxygen concentration at the inlet to the first catalyst bed is from 20 to 200, preferably from 50 to 100, vol. ppm.

In the first stage, active carbon is used as the catalyst. The metal carbonyls present in the gas react with oxygen to form the metal oxides. Since these are non-volatile, they are deposited in the active carbon bed. The space velocity in this stage should be from 500 to 5,000, preferably from 1,000 to 2,000, m³ (S.T.P.) per m³ of catalyst per hour. After leaving the active carbon layer, the gas passes directly into a second stage, in which the novel Cu/ZnO catalyst is present.

In the preparation of the catalyst, the catalyst precursor in the form of a mixed crystalline compound of the zinc hydroxide carbonate type $(Zn_5(OH)_6(CO_3)_2)$ is formed initially or by precipitation. In this zinc hydroxide carbonate, some of the $Zn^{2+}$ ions are replaced by $Cu^{2+}$ ions, resulting in the formation of a mixed crystalline product. The novel process requires catalyst precursors of the general formula $$Cu_xZn_y(OH)_6(CO_3)_2$$

with the provisos that first $x+y=5$ and secondly x and y are integers or non-integral numbers within the ranges
$x=1.0-2.5$
$y=2.5-4$.

Precipitation of the components in the form of these mixed crystals leads to an atomic distribution of the active components over the lattice sites of the mixed crystal. Subsequent thermal decomposition of the mixed crystalline compound to the oxidic catalyst gives an optimum distribution of the components.

In order to inhibit thermal recrystallization, it has proved advantageous to coprecipitate from 1 to 15 atom % of aluminum, chromium and/or boron as structural promoters during the precipitation of the catalyst precursor.

The oxidic catalyst is generally tableted after lubricants have been added. To bring it into its active form, the catalyst is reduced in a reactor with an $H_2/N_2$ mixture. The space velocity in this stage should be from 500 to 5,000 m³ (S.T.P.) per m³ of catalyst per hour.

It has been disclosed that pure Cu catalysts can be employed for removing traces of oxygen, and ZnO catalysts for removing $H_2S$. For removal of sulfur compounds over ZnO, it is, however, advantageous to employ an upstream hydrogenation stage which converts the particular sulfur compounds to $H_2S$, which is then absorbed on the ZnO. Advantageous hydrogenation catalysts for this purpose are sulfur-resistant Co/Mo or Ni/Mo catalysts.

It was surprising that rapid deactivation did not take place when the novel Cu/ZnO catalyst was used for the fine purification of sulfur-containing gases. The catalyst maintains, for a surprisingly long time, its ability not only to retain all sulfur compounds but also to remove a large number of other troublesome impurities, eg. free oxygen, HCN, CHOOH, HCl and mercury.

This surprising result or unusual behavior of the novel catalysts could be explained, in retrospect, as follows: sulfur, which is present as the main impurity in the gas, is not bonded irreversibly to the copper but, owing the atomic distribution of Cu and ZnO as a result of the specific method of preparation, is transferred, in a secondary solid-state reaction, to the ZnO to form the more stable compound ZnS. The copper is then available for further reactions. This behavior of the novel catalyst is all the more surprising since the conventional ZnO catalysts remove hydrogen sulfide from gases in a similarly quantitative form only at about 300° C.

The three Examples which follow illustrate the novel process. In the first Example, the preparation of the catalyst according to the invention is described.

Examples 2 and 3 describe the purification of a CO-containing and of a CO-free gas, respectively.

EXAMPLE 1

Preparation of an aluminum-doped Cu/ZnO catalyst

First, an aluminum-doped mixed crystalline product of the zinc hydroxide carbonate type is precipitated from two solutions. The solutions are prepared as follows:

Solution 1

7.200 kg of $Cu(NO_3)_2.3H_2O$,
11.275 kg of $Zn(NO_3)_2.6H_2O$ and
1.473 kg of $Al(NO_3)_3.9H_2O$
are dissolved in water, and the solution is made up to 36 liters.

Solution 2

7.850 kg of sodium carbonate are dissolved in water, and the solution is made up to 37 liters.

The two solutions are pumped through parallel feeds into a heatable stirred kettle, and the catalyst precursor is thus precipitated. The feed velocity of the two solutions is controlled so that the pH is maintained at 7-7.5 during the precipitation. The pH is measured with an electrode which is checked continuously using Lymphan paper.

During precipitation, the temperature in the kettle is maintained at 80° C. After the precipitation, stirring is continued for a further 15-60 minutes at from 60° to 80° C., and the precipitate is then filtered off and washed nitrate-free. The filter cake is either dried at 115° C. in a drying oven and then calcined at 270° C., or dried by spray drying and calcined at the same time. As a result of the spray drying procedure, the oxidic product undergoes a loss on calcination of 9.5% by weight. This is determined by heating for 2 hours at 900° C.

The resulting product is mixed with graphite as a lubricant, and the mixture is then tableted. The oxidic moldings obtained have a crushing strength of 500 kg/cm² and a BET specific surface area of 110 m²/g.

EXAMPLE 2

Carbon dioxide from the acid gas wash of a conversion plant is to be purified to such an extent that it conforms to the requirements of the Food Act and can be used for the production of mineral water. The carbon dioxide is saturated with water at 40° C. and contains, in addition to 0.1 vol.% of hydrogen, not more than 6 mg of sulfur compounds in the form of $H_2S$, COS and $CH_3SH$. The gas is heated to 100° C. and is passed into a reactor which contains the novel Cu/ZnO catalyst. The space velocity is adjusted to 2,000 m³ (S.T.P.) per m³ of catalyst per hour.

At the reactor exit, the content of sulfur compounds has decreased below the detection limit.

EXAMPLE 3

A synthesis gas, which consists of about 48.5 vol.% of CO and 51.5 vol.% of $H_2$ and is obtained by partial oxidation of atmospheric residues, contains, as impurities, 1.5 mg/m³ (S.T.P.) of sulfur compounds in the form of $H_2S$, COS and $CH_3SH$), 1 mg/m³ (S.T.P.) of HCN and 0.4 mg/m³ (S.T.P.) of Ni carbonyl, Fe carbonyl and V carbonyl.

1,000 m³ (S.T.P.) of this synthesis gas are mixed with 100 liters of oxygen, and the mixture is heated to 100° C. in a heat exchanger and is fed into a reactor from above. The upper part of the reactor contains active carbon, and the space velocity in this part of the reactor is 2,000 m³ (S.T.P.) per m³ of catalyst per hour. Analysis of the gas which leaves the active carbon layer shows that the carbonyl content has decreased below the detection limit.

The gas then passes, without further treatment, into the downstream bed of the novel Cu/ZnO catalyst. The catalyst volume is such that here too the space velocity is 2,000 m³ (S.T.P.) per m³ of catalyst per hour.

After leaving the Cu/ZnO layer, the gas is cooled to ambient temperature in order to prevent carbonyls forming again in the pipeline system.

Traces of hydrogen cyanide, and sulfur compounds, are no longer detectable in the purified gas.

We claim:

1. A process for the purification of a gas containing CO and/or $CO_2$, in which the compounds $H_2S$, COS, $CS_2$, $CH_3SH$, higher mercaptans, HCN, CHOOH, HCL, Fe Carbonyls, Ni carbonyls and Vanadium carbonyls and unreacted oxygen, said compounds being contained in gases produced by the partial oxidation of fossil fuels, as well as mercury which is present in the hydrogen produced in the electrolysis of alkali metal chlorides are removed by catalytic reaction at elevated temperatures, wherein the gas to be purified is passed directly through a catalyst charge containing a Cu/ZnO catalyst which is prepared by the thermal decomposition of a catalyst precursor of the formula $$Cu_xZn_y(OH)_6(CO_3)_2,$$

where $x+y=5$ and x and y are integers or non-integral numbers in the ranges $x=1.0-2.5$
$y=2.5-4.0$ and the space velocity is set at 500–5,000 m³ (S.T.P.) per m³ of catalyst per hour.

2. A process for the purification of a gas which additionally contains a metal carbonyl, as claimed in claim 1, wherein the gas to be purified is mixed with oxygen or oxygen-containing gases so that the oxygen content is from 20 to 200 vol. ppm and, before the actual catalytic treatment, is passed through an active carbon bed at from 50° to 150° C., at a space velocity of 500–5,000 m³ (S.T.P.) per m³ of catalyst per hour.

3. A process as claimed in claim 1, wherein, during the precipitation of the catalyst precursor, from 1 to 15 atom % of aluminum, chromium and/or boron are co-precipitated as structural promoters.

* * * * *